(12) United States Patent
Hutchins et al.

(10) Patent No.: US 10,401,632 B2
(45) Date of Patent: Sep. 3, 2019

(54) PLANAR HIGH ANGLE LINE GENERATOR

(71) Applicant: FLIR SYSTEMS, INC., Wilsonville, OR (US)

(72) Inventors: Robert Hutchins, Charlotte, NC (US); Alan D. Kathman, Charlotte, NC (US)

(73) Assignee: FLIR SYSTEMS, INC., Wilsonville, OR (US)

( * ) Notice: Subject to any disclaimer, the term of this patent is extended or adjusted under 35 U.S.C. 154(b) by 326 days.

(21) Appl. No.: 15/125,732

(22) PCT Filed: Mar. 9, 2015

(86) PCT No.: PCT/US2015/019435
§ 371 (c)(1),
(2) Date: Sep. 13, 2016

(87) PCT Pub. No.: WO2015/138316
PCT Pub. Date: Sep. 17, 2015

(65) Prior Publication Data
US 2017/0003510 A1 Jan. 5, 2017

Related U.S. Application Data

(60) Provisional application No. 61/953,412, filed on Mar. 14, 2014.

(51) Int. Cl.
*G02B 27/09* (2006.01)
*G02B 17/00* (2006.01)
(Continued)

(52) U.S. Cl.
CPC ....... *G02B 27/0927* (2013.01); *G02B 5/0284* (2013.01); *G02B 17/006* (2013.01);
(Continued)

(58) Field of Classification Search
CPC .......................... G02B 27/42; G02B 27/0037; G02B 27/4205; G02B 27/0944; G02B 27/4211;
(Continued)

(56) References Cited

U.S. PATENT DOCUMENTS 6,856,408 B2   2/2005  Raymond
2004/0105171 A1   6/2004  Minano et al.
(Continued)

OTHER PUBLICATIONS

International Search Report for PCT/US2015/019435; Robert Hutchins, et al.

*Primary Examiner* — Collin X Beatty
*Assistant Examiner* — Grant A Gagnon
(74) *Attorney, Agent, or Firm* — Lee & Morse, P.C.

(57) ABSTRACT

A planar line generator including a first planar surface extending in a first direction, a second planar surface facing the first planar surface, and a beam splitter in front of the second planar surface, the beam splitter configured to output, from light incident thereon, an undeflected beam, a first beam deflected to a first side of the undeflected beam along the first direction, and a second beam deflected to a second side of the undeflected beam along the first direction, wherein the second planar surface includes a line diffuser configured to receive the undeflected beam, and first and second diffusers having a design different from the line diffuser, the first and second diffusers being configured to receive the first and second beams, respectively.

21 Claims, 4 Drawing Sheets

(51) Int. Cl.
*G02B 27/14* (2006.01)
*G02B 5/02* (2006.01)
*G02B 27/42* (2006.01)
*G02B 27/10* (2006.01)

(52) U.S. Cl.
CPC ......... *G02B 27/1093* (2013.01); *G02B 27/14* (2013.01); *G02B 27/425* (2013.01); *G02B 27/4272* (2013.01)

(58) Field of Classification Search
CPC .... G02B 5/18; G02B 5/1895; G02B 27/0927; G02B 27/1086; G02B 27/0025; G02B 27/0075; G02B 27/4233; G02B 3/0081; G02B 5/1809; G02B 5/1814; G02B 5/1828; G02B 5/32; G02B 27/0905; G02B 27/425; G02B 27/4272; G02B 5/1819; G02B 15/173; G02B 19/0014; G02B 19/0028; G02B 19/0042; G02B 1/041; G02B 27/0081; G02B 27/1006; G02B 27/4244; G02B 27/4261; G02B 27/4277; G02B 27/4294; G02B 3/08; G02B 5/1852; G02B 5/1866; G02B 6/0035; G02B 13/18; G02B 15/00; G02B 15/14; G02B 19/0004; G02B 19/0019; G02B 1/11; G02B 21/0032; G02B 21/02; G02B 21/367; G02B 23/14; G02B 23/243; G02B 26/02; G02B 27/106; G02B 27/28; G02B 27/4222; G02B 27/44; G02B 3/0006; G02B 3/0012; G02B 3/0056; G02B 3/12; G02B 5/02; G02B 5/1847; G02B 5/1861; G02B 5/1876; G02B 5/3025; G02B 6/0038; G02B 6/005; G02B 6/0058; G02B 6/3518; G02B 6/4206; G02B 6/4214; G02B 7/008; G02B 9/34; G02B 13/004; G02B 13/0045; G02B 13/005; G02B 13/0055; G02B 13/0085; G02B 13/009; G02B 13/04; G02B 13/146; G02B 15/16; G02B 15/17; G02B 15/20; G02B 19/0047; G02B 19/0057; G02B 19/0066; G02B 19/0071; G02B 19/009; G02B 1/002; G02B 1/04; G02B 1/115; G02B 2006/12102; G02B 2006/12107; G02B 2027/0125; G02B 21/002; G02B 21/0084; G02B 21/10; G02B 21/16; G02B 2207/101; G02B 23/2438; G02B 23/2446; G02B 25/004; G02B 26/0833; G02B 26/10; G02B 27/00; G02B 27/0006; G02B 27/0012; G02B 27/0056; G02B 27/0101; G02B 27/0172; G02B 27/095; G02B 27/0961; G02B 27/0977; G02B 27/0983; G02B 27/0988; G02B 27/1013; G02B 27/104; G02B 27/1093; G02B 27/123; G02B 27/143; G02B 27/16; G02B 27/2242; G02B 27/26; G02B 27/283; G02B 27/4216; G02B 27/4238; G02B 27/4266; G02B 27/46; G02B 27/58; G02B 3/0043; G02B 3/005; G02B 3/0062; G02B 3/04; G02B 3/14; G02B 5/005; G02B 5/021; G02B 5/0215; G02B 5/06; G02B 5/1857; G02B 5/1885; G02B 5/30; G02B 5/3016; G02B 6/0015; G02B 6/0018; G02B 6/0036; G02B 6/006; G02B 6/29314; G02B 6/3512; G02B 6/3516; G02B 6/3534; G02B 6/3546; G02B 6/3556; G02B 6/356; G02B 6/4224; G02B 6/4231; G02B 6/4232; G02B 6/4238; G02B 6/4239; G02B 6/4246; G02B 7/025; G02B 7/28; G02B 9/12; G02B 9/62; G11B 7/1353; G11B 7/1374; G11B 2007/0006; G11B 7/13922; G11B 2007/13727; G11B 7/1275; G11B 7/0065; G11B 7/123; G11B 7/1362; G11B 7/1367; G11B 7/1372; G11B 7/1376; G11B 7/1381; G11B 7/139; G11B 7/13925; G11B 7/22; G11B 7/24044; G11B 7/245; G02C 7/06; G02C 2202/22; G02C 7/022; G02C 7/04; G02C 7/049; G02C 11/10; G02C 2202/20; G02C 7/02; G02C 7/08; G02C 7/081; G02C 7/083; G02C 7/085; G02C 7/088
USPC .......................................................... 359/558
See application file for complete search history.

(56) References Cited

U.S. PATENT DOCUMENTS

2005/0285928 A1 12/2005 Broome et al.
2006/0203490 A1 9/2006 Saccomanno et al.
2006/0256415 A1 11/2006 Holmes et al.

PLANAR HIGH ANGLE LINE GENERATOR

CROSS-REFERENCE TO RELATED APPLICATION

The present application claims priority under 35 U.S.C. § 119(e) to U.S. Provisional Application No. 61/953,412, filed on Mar. 14, 2014, and entitled: "Planar High Angle Line Generator," which is incorporated herein by reference in its entirety.

BACKGROUND

1. Field

One or more embodiments described herein relate to a planar high angle degree line generator.

2. Description of the Related Art

Some applications require a curtain of illumination to be provided on a user, e.g., to detect motion, recognize gestures, and so forth. In order to accurately process the information about the user, a fair amount of power may be required to illuminate the user. Thus, diffusers may be employed to insure uniform and safe illumination with sufficient power. Existing planar line generators are typically limited to about 100 degrees, with extreme roll off with increasing angle. There are effective limitations due to Snell's law for refractive diffusers and obliquity for diffractive diffusers that curtail projected power at angles above about 50 degrees off axis, i.e., along the optical axis, e.g., for a total angular extent of 100 degrees.

SUMMARY

One or more embodiments is directed to a planar line generator including a first planar surface extending in a first direction, a second planar surface facing the first planar surface, and a beam splitter in front of the second planar surface, the beam splitter configured to output, from light incident thereon, an undeflected beam, a first beam deflected to a first side of the undeflected beam along the first direction, and a second beam deflected to a second side of the undeflected beam along the first direction, wherein the second planar surface includes a line diffuser configured to receive the undeflected beam, and first and second diffusers having a design different from the line diffuser, the first and second diffusers being configured to receive the first and second beams, respectively.

The first planar surface and the second planar surface may be on a single substrate.

The first planar surface may be on a first substrate and the second planar surface may be on a second substrate.

The planar line generator may include a gap between the beam splitter and the line diffuser, the first and second beams being reflected at an interface between the first substrate and the gap. The second substrate may include an indent providing the gap. The first and second beams reflected from the first planar surface, after being reflected at the interface, may avoid the gap.

The first and second beams may be incident on the first and second diffusers twice, respectively. The planar line generator may inlcude first and second reflective surfaces receiving the first and second beams reflected from the first and second diffusers and reflecting the first and second beams back on to the first and second diffusers, respectively. The first and second reflective surfaces may be reflective diffractive optical elements. The first and second reflective surfaces may be between the first and second substrates. The first and second beams are reflected between the second and first planar surfaces before being incident on the first and second diffusers. Reflections may be due to total internal reflection.

The first and second diffusers may output asymmetric beams. The first beam may be output from the first diffuser as a first asymmetric beam having evanescent zero and negative orders, and the second beam may be output from the second diffuser as a second asymmetric beam having evanescent zero and positive orders. The asymmetric beams may combine with a symmetric beam output from the line diffuser to realize a line having a higher angle than that output from the line diffuser.

The first and second diffusers have the same design in symmetric configuration.

The beam splitter may be on the first planar surface.

The beam splitter may be between the first planar surface and the second planar surface.

One or more embodiments is directed to a planar line generator including a first planar surface including extending in a first direction, a second planar surface facing the first planar surface, and a beam splitter on the first planar surface or between the first planar surface and the second planar surface, the beam splitter being configured to output, from light incident thereon, an undeflected beam, a first beam deflected to a first side of the undeflected beam along the first direction, and a second beam deflected to a second side of the undeflected beam along the first direction, the second planar surface including a symmetric diffuser configured to receive the undeflected beam and output a symmetric beam, and first and second asymmetric diffusers, the first and second asymmetric diffusers being configured to receive the first and second beams, respectively, and output first and second asymmetric beams.

The first beam may be output from the first asymmetric diffuser as a first asymmetric beam having evanescent zero and negative orders, and the second beam may be output from the second asymmetric diffuser as a second asymmetric beam having evanescent zero and positive orders.

The symmetric diffuser may be a line diffuser.

BRIEF DESCRIPTION OF THE DRAWINGS

Features and advantages will become apparent to those of skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete. As used herein, a high angle line generator refers to a generator that outputs a line, e.g., substantially uniform light with an angular extent of greater than 120 degrees in on axis, i.e., ±60 degrees relative to the optical axis, and less than 1 degree in the orthogonal axis.

Figure 1:
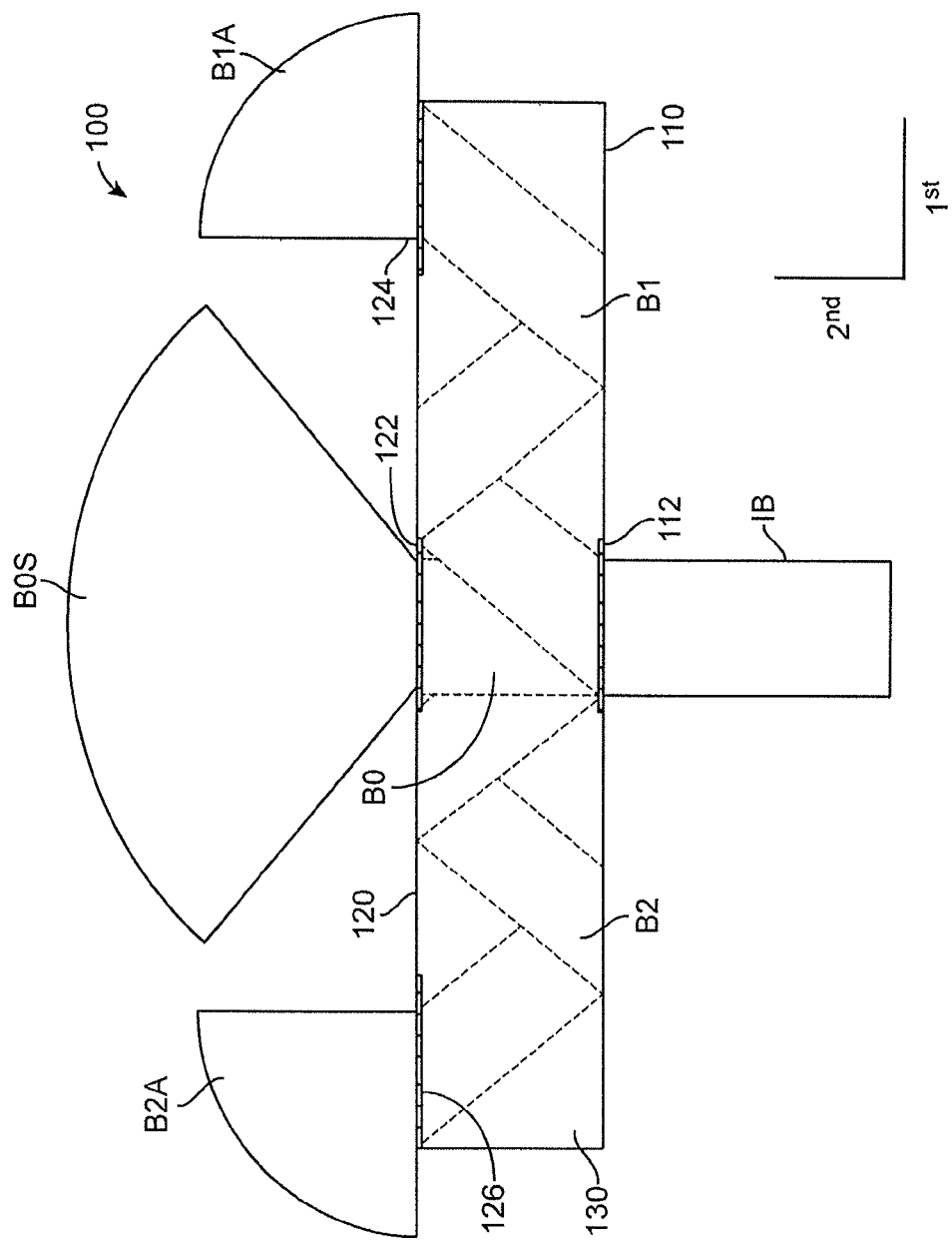
FIG. 1 illustrates a schematic side view of a planar high angle line generator in accordance with a first embodiment.

FIG. 1 illustrates a schematic side view of a planar high angle line generator 100 in accordance with a first embodiment. As shown therein, the planar high angle line generator 100 may include a first planar surface 110 and a second planar surface 120, facing the first planar surface and receiving light output from the first planar surface 110. The first and second planar surfaces 110, 120 may be opposite surfaces of a single, e.g., the same, substrate 130, i.e., the planar high angle line generator 100 may be monolithic. The first and second planar surfaces 110, 120 may extend along a first direction and the input light may be incident on the first planar surface 110 along a second direction, orthogonal to the first direction.

The first planar surface 110 may include a beam splitter 112, e.g., a 3×1 grating, which, when an input beam IB is incident thereon, outputs a zero order or undeflected beam B0, a first deflected beam B1, e.g., a +1 order beam, and a second deflected beam B2, e.g., a −1 order beam. Thus, the first and second deflected beams are on opposite sides of the undeflected beam B0 along the first direction.

The undeflected beam B0 propagates through the substrate 130 towards the second planar surface 120 along the second direction to be incident on a line diffuser 122. The line diffuser 122 outputs a beam B0S that is symmetric with respect to the second direction about a zero order output from the line diffuser 122. As can be seen therein, the line diffuser 122 alone does not generate a high angle line. Single surface linear diffusers are limited to about 100 degrees full angle.

The first and second deflected beams B1, B2 propagate at an angle to the second direction in, e.g., within, the substrate 130. The material of the substrate 130 and the angles of the first and second deflected beams B1, B2 may be selected such that the first and second deflected beams are reflected at the second planar surface 120 due to total internal reflection, back towards the first planar surface 110, where the first and second deflected beams are again totally reflected back towards first and second diffusers 124, 126 on the second planar surface 120.

Alternatively, instead of relying on total internal reflection, a mirror could be provided on the first and second planar surfaces 110, 120 to direct the first and second beams B1, B2 onto the first and second diffusers, respectively. Reflection within the substrate 130 may be used to increase spacing between the line diffuser 122 and the first and second diffusers 124, 126 or to increase the size of the planar high angle line generator 100 for other reasons, e.g., ease of alignment to other elements. Alternatively, if the substrate 130 is thick enough along the second direction to provide sufficient separation between the line diffuser 122 and the first and second diffusers 124, 126, the first and second beams may propagate directly from the beam splitter 112 to the first and second diffusers 124, 126.

These first and second diffusers 124, 126 may have a same design and be of a design other than a line diffuser. For example, the first and second diffusers may have a roll-off that is 1-D Gaussian or super-Gaussian. Such first and second diffusers may be realized using a two-phase level diffractive. Beams B1A and B2A output from the first and second diffusers 124, 126 will have the zero-th order and half the orders that are evanescent and thus do not propagate. In particular, the first asymmetric beam B1A has evanescent zero and negative orders and the second asymmetric beam B2A has evanescent zero and positive orders. Most of the evanescent behavior of light output from the first and second diffusers 124, 126 is due to the high incident angle. Thus, the beams B1A and B2A will be asymmetric with respect to the second direction about a zero order output from the first and second diffusers 124, 126.

The asymmetric beams B1A and B2A combine with the symmetric beam BS0 to provide a high angle line, i.e., a line having a higher angle than realized by the symmetric beam BS0 alone. The use of the asymmetric outputs allows distortion to be compensated and roll-off to be corrected.

Figure 2:
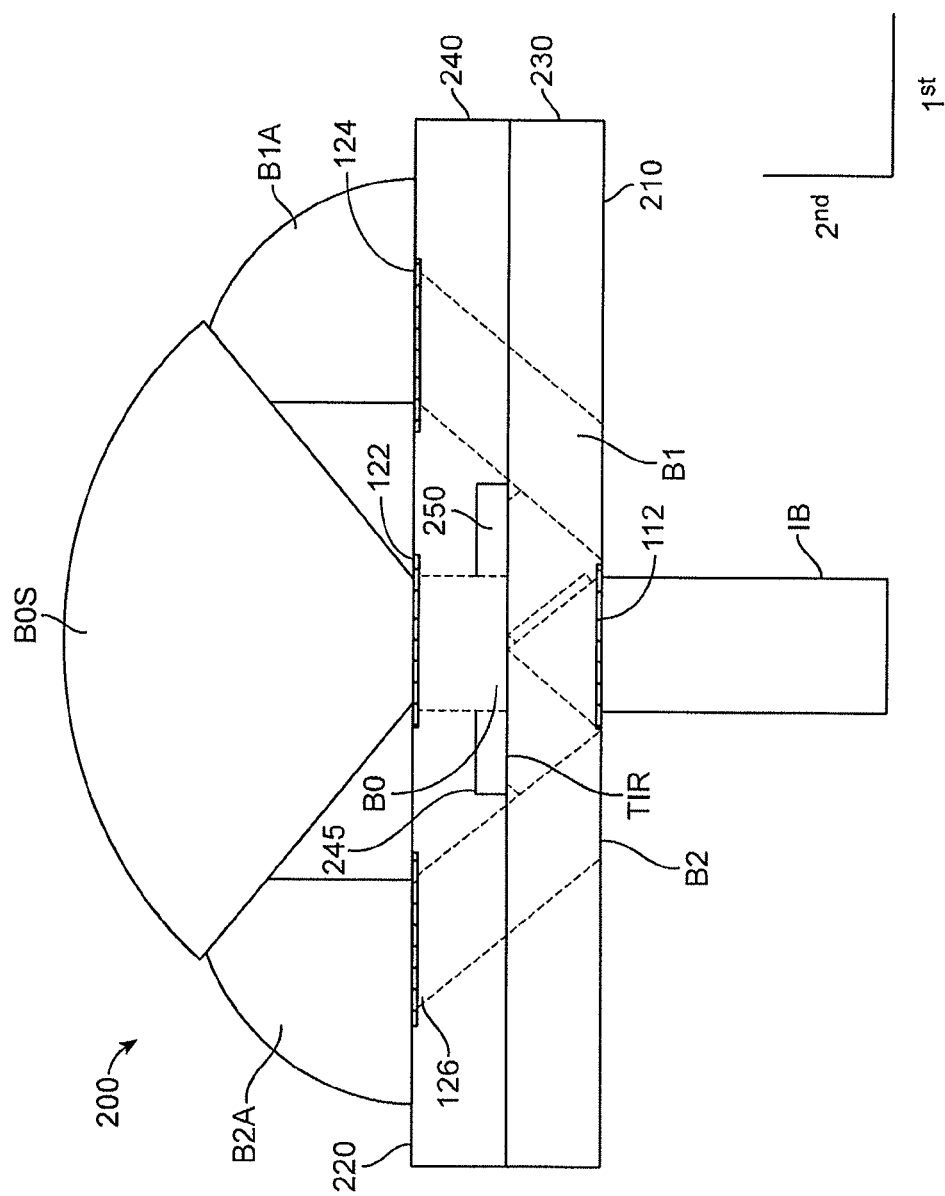
FIG. 2 illustrates a schematic side view of a planar high angle line generator in accordance with a second embodiment.

FIG. 2 illustrates a schematic side view of a planar high angle line generator 200 in accordance with a second embodiment. As shown therein, the planar high angle line generator 200 may include a first planar surface 210 and a second planar surface 220, facing the first planar surface 210 and receiving light output from the first planar surface 210. The first and second planar surfaces 210, 220 may extend along a first direction and the input light may be incident on the first planar surface 210 along a second direction, orthogonal to the first direction.

Different from the first embodiment, the first planar surface 210 may be on a first planar substrate 230 and the second planar surface 220 may be on a second substrate 240, different from the first substrate 230, that includes an indent 245 providing a gap 250 between the beam splitter 112 and the line diffuser 122. This gap 250 may be filled with air, an index matching polymer therein, or glass such that the higher orders output by the beam splitter 112 are reflected back towards the first planar surface 210 to provide separation of the orders.

As can be seen in FIG. 2, the undeflected beam B0 passes through the indent 245 to be incident on the line diffuser 122. The first and second deflected beams B1 and B2 may be reflected back toward the first planar surface 210, where they are reflected, either due to total internal reflection or a reflective material provided on the first planar surface 210, back toward the second planar surface 220 onto the first and second diffusers 124, 126 thereon. This configuration allows for a thinner, i.e., in the second direction, overall planar high angle line generator 200.

Figure 3:
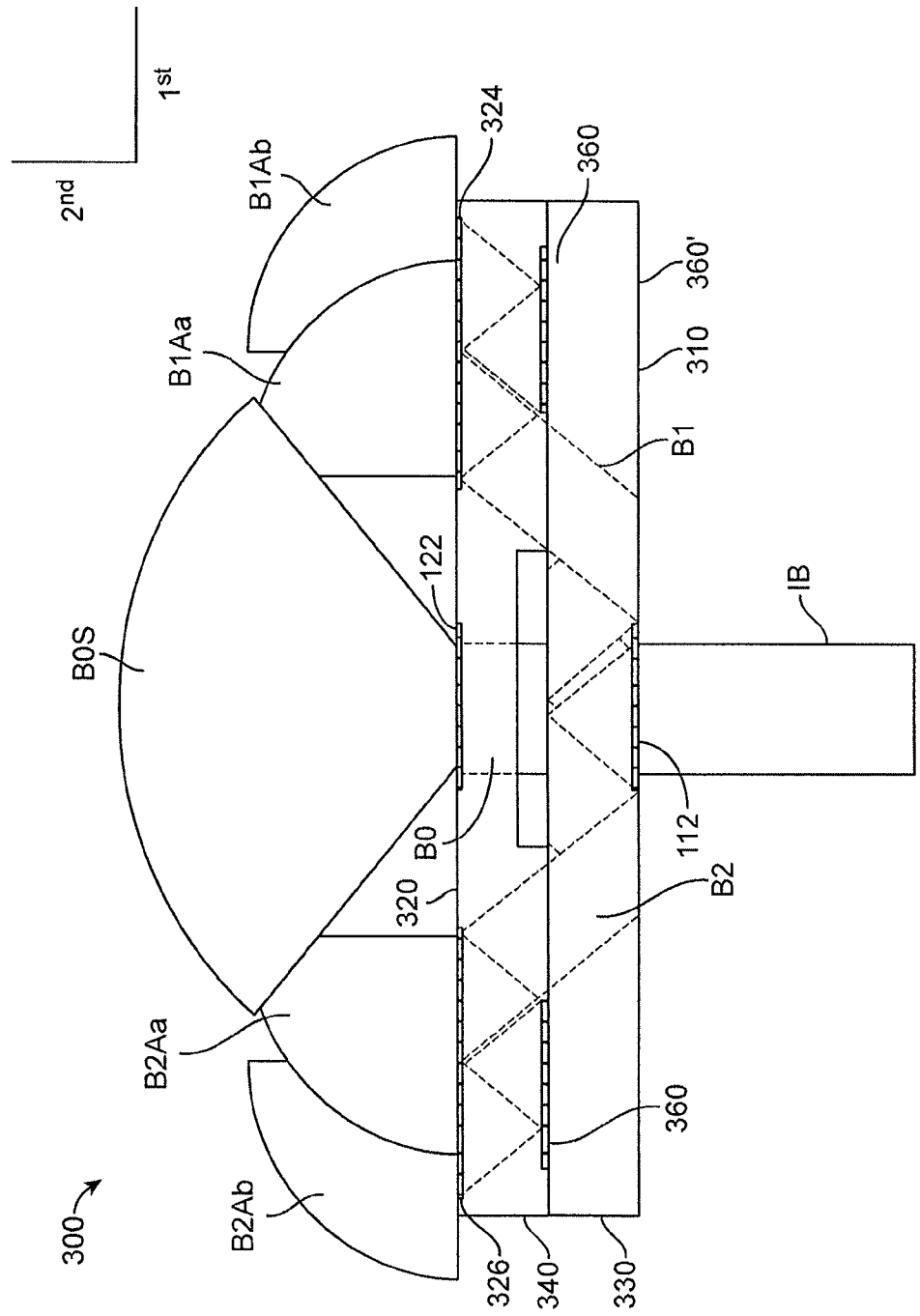
FIG. 3 illustrates a schematic side view of a planar high angle line generator in accordance with a third embodiment.

FIG. 3 illustrates a schematic side view of a planar high angle line generator 300 in accordance with a third embodiment. As shown therein, the planar high angle line generator 300 may include a first planar surface 310 and a second planar surface 320, facing the first planar surface 310 and receiving light output from the first planar surface 310. The first and second planar surfaces 310, 320 may extend along a first direction and the input light IB may be incident on the first planar surface 310 along a second direction, orthogonal to the first direction.

Like the second embodiment, the first planar surface 310 may be on a first planar substrate 330 and the second planar surface 320 may be on a second substrate 340 that includes an indent 345 providing a gap 350 between the beam splitter 112 and the line diffuser 122. This gap 350 may be filled with air, an index matching polymer, or glass such that the higher orders output by the beam splitter 112 to be reflected back towards the first planar surface 310 to provide separation of the orders.

Different from the second embodiment, the planar high angle line generator 300 may include an embedded reflective surface or reflective diffractive optical element (DOE) 360 in either the first substrate 330 or the second substrate 340. Thus, if there are significant reflections from diffusers 324, 326, this embedded reflective 360 will reflect light back towards extended or segmented diffusers 324, 326 for improved efficiency, such that the first and second diffusers 324, 326 output a total of four asymmetric beams B1a, B1Ab, B2Aa, and B2Ab. Alternatively, if the second substrate 340 is thin, a reflective 360' may be provided on the first planar surface 310. When a reflective DOE is used, the DOE may be designed to perform additional beam steering or provide an alternate diffusion function.

Figure 4:
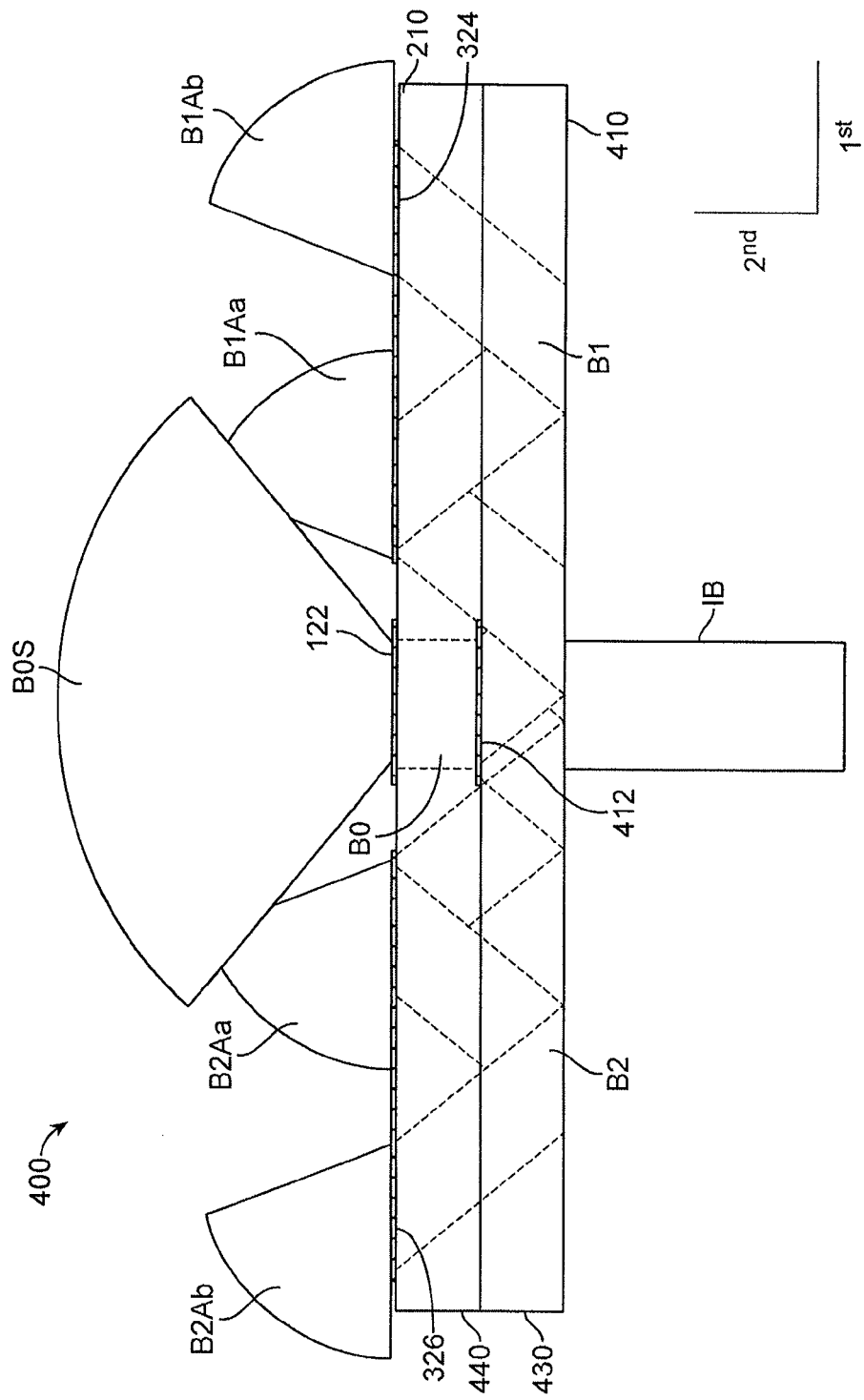
FIG. 4 illustrates a schematic side view of a planar high angle line generator in accordance with a fourth embodiment.

FIG. 4 illustrates a schematic side view of a planar high angle line generator 400 in accordance with a fourth embodiment. As shown therein, the planar high angle line generator 400 may include a first planar surface 410 and a second planar surface 420, facing the first planar surface 410 and receiving light output from the first planar surface 410. The first and second planar surfaces 410, 420 may extend along a first direction and the input light IB may be incident on the first planar surface 410 along a second direction, orthogonal to the first direction.

Like the second and third embodiments, the first planar surface 410 may be on a first planar substrate 430 and the second planar surface 420 may be on a second substrate 440. However, unlike the second and third embodiments, there is no indent providing a gap between the beam splitter and the line diffuser. Instead a beam splitter 412 is in either the first substrate 430 or the second substrate 440.

By way of summation and review, by providing diffusers outputting asymmetric beams on opposite sides of a line diffuser in accordance with embodiments, roll-off and distortion of the line diffuser may be compensated, resulting in a high angle line. By using a beam splitter on a first planar surface and such diffusers on a second planar surface facing the first planar surface, the high angle line may be simply realized.

Embodiments of the present invention have been disclosed herein and, although specific terms are employed, they are used and are to be interpreted in a generic and descriptive sense only and not for purpose of limitation. For example, the indent may be in the first substrate or partially provided in both the first and second substrates. Also, light propagating in the substrate or substrates may be emitted at the edge of the device and contribute to the intensity of the line at higher deflected angles. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the present invention as set forth in the following claims.

What is claimed is:

1. A planar line generator, comprising:
   a first planar surface extending in a first direction;
   a second planar surface facing the first planar surface; and
   a beam splitter in front of the second planar surface, the beam splitter configured to simultaneously output, from light incident thereon, an undeflected beam, a first beam deflected to a first side of the undeflected beam along the first direction, and a second beam deflected to a second side of the undeflected beam along the first direction, wherein the second planar surface includes a line diffuser configured to receive the undeflected beam, and first and second diffusers having a design different from the line diffuser, the first and second diffusers being configured to receive the first and second beams, respectively.

2. The planar line generator as claimed in claim 1, wherein the first planar surface and the second planar surface are on a single substrate.

3. The planar line generator as claimed in claim 1, wherein the first and second diffusers have the same design in symmetric configuration.

4. The planar line generator as claimed in claim 1, wherein the beam splitter is on the first planar surface.

5. The planar line generator as claimed in claim 1, wherein the beam splitter is between the first planar surface and the second planar surface.

6. The planar line generator as claimed in claim 1, wherein the first and second beams are reflected between the second and first planar surfaces before being incident on the first and second diffusers.

7. The planar line generator as claimed in claim 6, wherein reflections are due to total internal reflection.

8. The planar line generator as claimed in claim 1, wherein the first and second diffusers output asymmetric beams.

9. The planar line generator as claimed in claim 8, wherein:
   the first beam is output from the first diffuser as a first asymmetric beam having evanescent zero and negative orders; and
   the second beam is output from the second diffuser as a second asymmetric beam having evanescent zero and positive orders.

10. The planar line generator as claimed in claim 8, wherein the asymmetric beams combine with a symmetric beam output from the line diffuser to realize a line having a higher angle than that output from the line diffuser.

11. The planar line generator as claimed in claim 1, wherein the first planar surface is on a first substrate and the second planar surface is on a second substrate.

12. The planar line generator as claimed in claim 11, further comprising a gap between the beam splitter and the line diffuser, the first and second beams being reflected at an interface between the first substrate and the gap.

13. The planar line generator as claimed in claim 12, wherein the second substrate includes an indent providing the gap.

14. The planar line generator as claimed in claim 12, wherein the first and second beams reflected from the first planar surface, after being reflected at the interface, avoid the gap.

15. The planar line generator as claimed in claim 12, wherein the first and second beams are incident on the first and second diffusers twice, respectively.

16. The planar line generator as claimed in claim 15, further comprising first and second reflective surfaces receiving the first and second beams reflected from the first and second diffusers and reflecting the first and second beams back on to the first and second diffusers, respectively.

17. The planar line generator as claimed in claim 16, wherein the first and second reflective surfaces are reflective diffractive optical elements.

18. The planar line generator as claimed in claim 16, wherein the first and second reflective surfaces are between the first and second substrates.

19. A planar line generator, comprising:
   a first planar surface including extending in a first direction;
   a second planar surface facing the first planar surface; and
   a beam splitter on the first planar surface or between the first planar surface and the second planar surface, the beam splitter being configured to simultaneously output, from light incident thereon, an undeflected beam, a first beam deflected to a first side of the undeflected beam along the first direction, and a second beam deflected to a second side of the undeflected beam along the first direction, the second planar surface including a symmetric diffuser configured to receive the undeflected beam and output a symmetric beam, and first and second asymmetric diffusers, the first and second asymmetric diffusers being configured to receive the first and second beams, respectively, and output first and second asymmetric beams.

20. The planar line generator as claimed in claim 19, wherein:
the first beam is output from the first asymmetric diffuser as a first asymmetric beam having evanescent zero and negative orders; and
the second beam is output from the second asymmetric diffuser as a second asymmetric beam having evanescent zero and positive orders.

21. The planar line generator as claimed in claim 19, wherein the symmetric diffuser is a line diffuser.

* * * * *